US012572249B2

(12) United States Patent
Akedo et al.

(10) Patent No.: US 12,572,249 B2
(45) Date of Patent: Mar. 10, 2026

(54) DISPLAY DEVICE, EVALUATION METHOD, AND EVALUATION SYSTEM

(71) Applicant: SUMITOMO HEAVY INDUSTRIES, LTD., Tokyo (JP)

(72) Inventors: Yutaka Akedo, Yokosuka (JP);
Masanori Kadowaki, Yokosuka (JP);
Takashi Mizuno, Tokyo (JP); Yuka Morita, Tokyo (JP); Shota Ohno,
Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/994,165

(22) Filed: Nov. 25, 2022

(65) Prior Publication Data

US 2023/0093661 A1     Mar. 23, 2023

Related U.S. Application Data

(63) Continuation of application No. PCT/JP2021/020264, filed on May 27, 2021.

(30) Foreign Application Priority Data

May 28, 2020     (JP) ................................. 2020-093098

(51) Int. Cl.
G06F 3/0481          (2022.01)
G06F 3/04847        (2022.01)
(52) U.S. Cl.
CPC ........ G06F 3/0481 (2013.01); G06F 3/04847 (2013.01)

(58) Field of Classification Search
CPC ... G06F 3/0481; G06F 3/04847; G06N 20/00; G06Q 10/06
See application file for complete search history.

(56) References Cited

U.S. PATENT DOCUMENTS

| | | | | |
|---|---|---|---|---|
| 2014/0114639 A1* | 4/2014 | Yanoo | ..................... | G06F 30/00 |
| | | | | 703/21 |
| 2015/0379430 A1* | 12/2015 | Dirac | ..................... | G06N 20/00 |
| | | | | 706/12 |
| 2017/0200394 A1* | 7/2017 | Albrecht | .................. | G09B 9/00 |

(Continued)

FOREIGN PATENT DOCUMENTS

| | | | | | |
|---|---|---|---|---|---|
| EP | 3200038 A1 | * | 8/2017 | ............. | G05B 23/02 |
| JP | 2013-246508 | * | 5/2012 | ............. | G06F 17/60 |

(Continued)

OTHER PUBLICATIONS

PCT International Search Report of PCT/JP2021/020264 mailed Jul. 27, 2021 by Japan Patent Office.

*Primary Examiner* — Phenuel S Salomon
(74) *Attorney, Agent, or Firm* — WTA IP Law P.C.

(57)          ABSTRACT

Provided is a display device including a display screen, in which a plurality of evaluation models are configured to be displayed in a selectable manner in a first display area of the display screen, an evaluation result of evaluation data, which is obtained by using a selected first evaluation model, is configured to be displayed in a second display area of the display screen, and an evaluation result of the evaluation data, which is obtained by using a selected second evaluation model, is configured to be displayed in a third display area of the display screen.

9 Claims, 5 Drawing Sheets

(56)     References Cited

U.S. PATENT DOCUMENTS

| | | | |
|---|---|---|---|
| 2017/0323013 A1* | 11/2017 | Morimoto | A61B 5/165 |
| 2018/0114093 A1* | 4/2018 | Hasuko | G06Q 30/0201 |
| 2018/0218277 A1* | 8/2018 | Korsedal | G06N 7/01 |
| 2019/0143541 A1* | 5/2019 | Nemallan | G06N 3/0464 |
| | | | 700/246 |
| 2019/0198136 A1* | 6/2019 | Hou | G16C 20/90 |
| 2019/0385070 A1 | 12/2019 | Lee et al. | |
| 2021/0201079 A1* | 7/2021 | Watanabe | G06F 18/217 |
| 2021/0334702 A1* | 10/2021 | Yamashina | G06N 20/00 |
| 2023/0033495 A1* | 2/2023 | Sato | G06V 10/776 |

FOREIGN PATENT DOCUMENTS

| | | | | |
|---|---|---|---|---|
| JP | WO2012090937 | * | 5/2012 | G05B 23/0216 |
| JP | 2012-138044 | | 7/2012 | |
| JP | 2015-203936 | | 11/2015 | |
| JP | 2018-124851 | | 8/2018 | |
| JP | 2018-206283 | | 12/2018 | |
| WO | WO 2017/168458 | | 10/2017 | |

* cited by examiner

Figure 3:
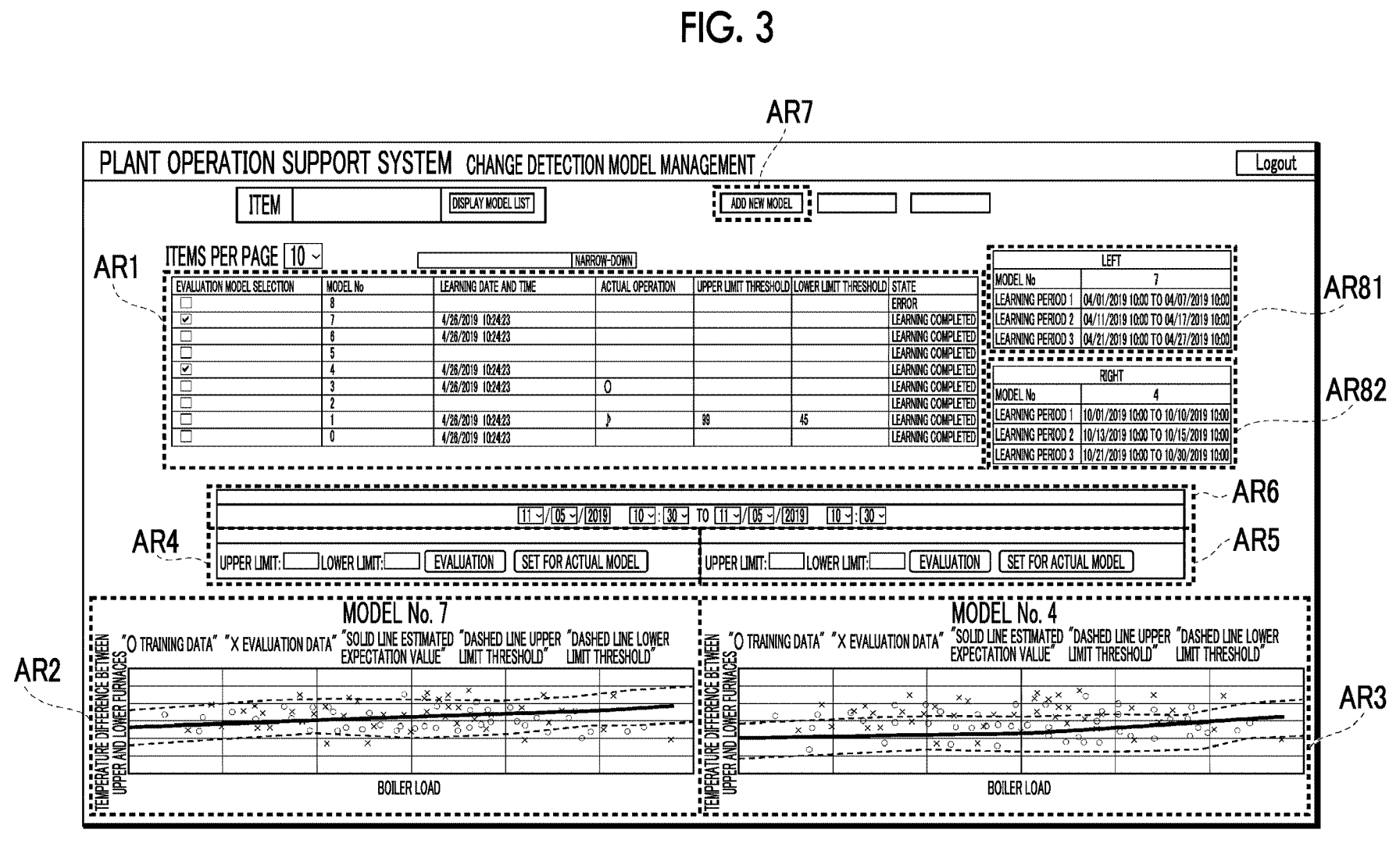

PLANT OPERATION SUPPORT SYSTEM    CHANGE DETECTION MODEL MANAGEMENT    Logout

ITEM    DISPLAY MODEL LIST

ADD NEW MODEL

ITEMS PER PAGE 10 ∨

NARROW-DOWN

AR1

| EVALUATION MODEL SELECTION | MODEL No | LEARNING DATE AND TIME | ACTUAL OPERATION | UPPER LIMIT THRESHOLD | LOWER LIMIT THRESHOLD | STATE |
|---|---|---|---|---|---|---|
| ☐ | 8 | | | | | ERROR |
| ☐ | 7 | 4/26/2019 10:24:23 | | | | LEARNING COMPLETED |
| ☐ | 6 | 4/26/2019 10:24:23 | | | | LEARNING COMPLETED |
| ☐ | 5 | | | | | LEARNING COMPLETED |
| ☑ | 4 | 4/26/2019 10:24:23 | | | | LEARNING COMPLETED |
| ☐ | 3 | 4/26/2019 10:24:23 | ○ | | | LEARNING COMPLETED |
| ☑ | 2 | | | | | LEARNING COMPLETED |
| ☐ | 1 | 4/26/2019 10:24:23 | ▶ | 99 | 45 | LEARNING COMPLETED |
| ☐ | 0 | 4/26/2019 10:24:23 | | | | LEARNING COMPLETED |

AR81

| MODEL No | LEFT | 7 |
|---|---|---|
| LEARNING PERIOD 1 | 04/01/2019 10:00 TO 04/07/2019 10:00 | |
| LEARNING PERIOD 2 | 04/11/2019 10:00 TO 04/17/2019 10:00 | |
| LEARNING PERIOD 3 | 04/21/2019 10:00 TO 04/27/2019 10:00 | |

AR82

| MODEL No | RIGHT | 4 |
|---|---|---|
| LEARNING PERIOD 1 | 10/01/2019 10:00 TO 10/10/2019 10:00 | |
| LEARNING PERIOD 2 | 10/13/2019 10:00 TO 10/15/2019 10:00 | |
| LEARNING PERIOD 3 | 10/21/2019 10:00 TO 10/30/2019 10:00 | |

AR6

AR5

11 ∨ / 05 ∨ / 2019    10 ∨ : 30 ∨    TO    11 ∨ / 05 ∨ / 2019    10 ∨ : 30 ∨

UPPER LIMIT:        LOWER LIMIT:        EVALUATION    SET FOR ACTUAL MODEL

AR4

11 ∨ / 05 ∨ / 2019    10 ∨ : 30 ∨    TO    11 ∨ / 05 ∨ / 2019    10 ∨ : 30 ∨

UPPER LIMIT:        LOWER LIMIT:        EVALUATION    SET FOR ACTUAL MODEL

AR2

MODEL No. 7
"SOLID LINE ESTIMATED    "DASHED LINE UPPER    "DASHED LINE LOWER
EXPECTATION VALUE"    LIMIT THRESHOLD"    LIMIT THRESHOLD"
"○ TRAINING DATA"    "× EVALUATION DATA"    "○ TRAINING DATA"
TEMPERATURE DIFFERENCE BETWEEN
UPPER AND LOWER FURNACES
BOILER LOAD

AR3

MODEL No. 4
"SOLID LINE ESTIMATED    "DASHED LINE UPPER    "DASHED LINE LOWER
EXPECTATION VALUE"    LIMIT THRESHOLD"    LIMIT THRESHOLD"
"○ TRAINING DATA"    "× EVALUATION DATA"    "○ TRAINING DATA"
TEMPERATURE DIFFERENCE BETWEEN
UPPER AND LOWER FURNACES
BOILER LOAD

DISPLAY DEVICE, EVALUATION METHOD, AND EVALUATION SYSTEM

CROSS-REFERENCE TO RELATED APPLICATIONS

This is a bypass continuation of International PCT Application No. PCT/JP2021/020264, filed on May 27, 2021, which claims priority to Japanese Patent Application No. 2020-093098, filed on May 28, 2020, which are incorporated by reference in their entirety.

BACKGROUND

Technical Field

Certain embodiment of the present invention relates to a display device, an evaluation method, and an evaluation system.

Description of Related Art

In the related art, process data is acquired from a plurality of sensors installed on a control object such as a plant, and based on this, an operation situation of the control object is monitored and controlled. An evaluation model may be used to monitor the operation situation of the control object based on the process data. It is possible to determine whether or not the control object is operated normally, based on an evaluation result obtained by evaluating the process data, which is acquired from the control object, according to a predetermined evaluation model.

In order to accurately monitor the operation situation of the control object, an evaluation model having good performance is required. In order to acquire an evaluation model having good performance, it is necessary to perform trial and error because it involves adjustment of parameters and the like constituting the evaluation model and work of comparing and selecting a plurality of evaluation models.

The related art discloses a model information display method for efficiently comparing a plurality of evaluation models. According to this model information display method, when a plurality of evaluation models are selected, the plurality of evaluation models are simultaneously displayed such that the amount of information to be displayed is different according to the selected number. Therefore, it is possible to efficiently compare a plurality of evaluation models.

SUMMARY

According to an embodiment of the present disclosure, there is provided a display device including a display screen. A plurality of evaluation models are configured to be displayed in a selectable manner in a first display area of the display screen, an evaluation result of evaluation data obtained by using a selected first evaluation model is configured to be displayed in a second display area, and an evaluation result of the evaluation data obtained by a selected second evaluation model is configured to be displayed in a third display area.

According to another embodiment of the present disclosure, there is provided an evaluation method. The evaluation method includes: a step of displaying a plurality of evaluation models in a selectable manner in a first display area of a display screen; a step of displaying an evaluation result of evaluation data, which is obtained by using a selected first evaluation model, in a second display area of the display screen; and a step of displaying an evaluation result of the evaluation data, which is obtained by using a selected second evaluation model, in a third display area of the display screen.

According to still another embodiment of the present disclosure, there is provided an evaluation system. The evaluation system includes: a unit that selects a plurality of evaluation models; a unit that acquires an evaluation result of evaluation data obtained by using a selected first evaluation model; and a unit that acquires an evaluation result of the evaluation data obtained by using a selected second evaluation model.

BRIEF DESCRIPTION OF THE DRAWINGS

FIG. 2 is a functional block diagram of an evaluation system.

FIG. 3 is a display screen of a display device.

DETAILED DESCRIPTION

Figure 1:
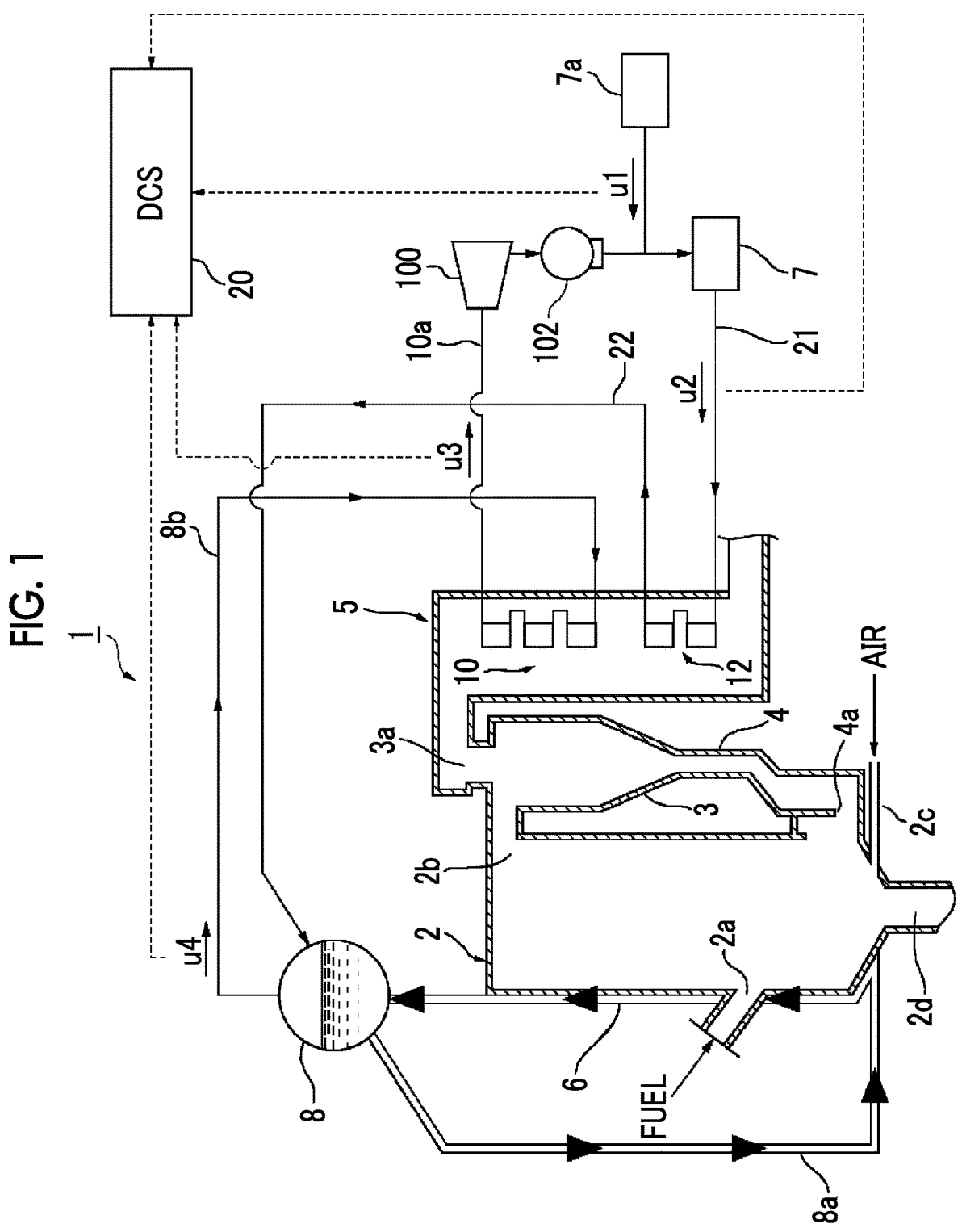
FIG. 1 is a schematic diagram of a plant.

However, the model information display method described in the related art merely provides a display method that enables comparison of a plurality of evaluation models. Therefore, it is not possible to sufficiently streamline the work required to obtain an appropriate evaluation model.

Therefore, it is desirable to provide a display device, an evaluation method, and an evaluation system capable of efficiently acquiring an appropriate evaluation model.

The evaluation data is data evaluated by using the evaluation model. For example, process data (including raw data in which a calculation process is not performed) acquired from a plurality of sensors installed in a control object such as a plant can be evaluated as evaluation data.

The process data may fluctuate depending on the season or other environment even when the process data is controlled based on the same control data. Further, the evaluation data may fluctuate due to a change with time of a component or the like of the control object even when the evaluation data is controlled based on the same control data.

A first evaluation reference, which is used for evaluation by the first evaluation model, may be configured to be displayed in a settable manner in a fourth display area of the display screen, a second evaluation reference, which is used for evaluation by the second evaluation model, may be configured to be displayed in a settable manner in a fifth display area of the display screen, the second display area may be configured such that the evaluation result of the evaluation data, which is obtained by using the selected first evaluation model, is capable of being displayed based on the set first evaluation reference, and the third display area may be configured such that the evaluation result of the evaluation data, which is obtained by using the selected second evaluation model, is capable of being displayed based on the set second evaluation reference.

A period of the evaluation data may be configured to be displayed in a settable manner in a sixth display area of the display screen, the second display area may be configured such that an evaluation result of the evaluation data in the set period, which is obtained by using the first evaluation model, is capable of being displayed, and the third display area may be configured such that an evaluation result of the evaluation data in the set period, which is obtained by using the second evaluation model, is capable of being displayed.

The period of the evaluation data refers to a period during which the evaluation data is acquired.

The first evaluation model may be a model generated, based on a training data range (a plurality of training data belonging to a predetermined range), by using a machine learning model having a predetermined parameter, and in the display device, a value of the parameter and the training data range may be configured to be displayed in a settable manner in a seventh display area of the display screen, and the second display area may be configured such that an evaluation result of the evaluation data, which is obtained by using an evaluation model generated by using the machine learning model having the set value of the parameter, is capable of being displayed. Note that, at least a part of the value of the parameter or the training data range may be displayed in a settable manner in the seventh display area, in the same display screen as the display screen that displays the first to sixth display areas, or the value of the parameter or the training data range may be displayed in a settable manner by transitioning a screen to a different display screen via the seventh display area. In the former case, since it is possible to display the display result in the second display area after the value of the parameter or the like is changed in the seventh display area, it is possible to efficiently acquire an appropriate evaluation model.

The machine learning model includes a model using a neural network such as a convolution neural network (CNN), a model using a regression model such as Gaussian process regression, and a model using a tree algorithm such as a decision tree.

The training data may also be referred to as teacher data. The training data includes, for example, process data when a control object such as a plant is being operated properly. Further, the training data includes, for example, process data when the control object such as a plant is being operated properly at high power, process data when the control object is being operated properly at medium power, and process data when the control object is being operated properly at low power.

The parameter of the machine learning includes variable which is capable of being set. When the parameters are different, different evaluation models are generated based on the same training data. The parameter includes a hyperparameter, and includes, for example, the number of layers such as a decision tree, the number of units of an intermediate layer in a neural network, a parameter indicating load attenuation, and the like.

The first display area may be configured such that the machine learning model having the set value of the parameter is capable of being selected and displayed in the first display area together with the plurality of evaluation models.

At least one of information, which indicates that the evaluation model, among the plurality of evaluation models, was used in the past for evaluating process data acquired from a control object, and information, which indicates that the evaluation model is being used in the present for evaluating the process data acquired from the control object, may be configured to be displayed in the first display area.

Further, an evaluation model to be selected from among the plurality of evaluation models may be configured so as to be displayed in the first display area in a replicable or deletable manner.

The present disclosure provides an evaluation system for evaluating an operation situation of a plant. The evaluation system includes a unit that selects a first evaluation model generated as training data from the process data acquired from a sensor installed in the plant during a first period and a second evaluation model generated as training data from the process data acquired from a sensor installed in the plant during a second period. The selected first evaluation model evaluates the evaluation data acquired from the sensors installed in the plant. The evaluation result is configured to be displayed. The selected second evaluation model evaluates the same evaluation data acquired from the sensor installed in the plant. The evaluation result is configured to be displayed. The evaluation data may include process data when the operation situation of the plant becomes abnormal. The first evaluation model may be a model generated, based on the training data, by using the machine learning model having one or a plurality of parameters set to a predetermined value. One or the plurality of parameters may be configured in a settable manner. When the parameter is newly set, the evaluation model may be newly generated by using the machine learning model having the set parameter.

The present disclosure provides an evaluation method for evaluating an operation situation of a plant. The evaluation method includes a step of displaying a first evaluation model generated as training data from the process data acquired from a sensor installed in the plant during a first period and a second evaluation model generated as training data from the process data acquired from a sensor installed in the plant during a second period, in a selectable manner in the first display area of the display screen. The evaluation method also includes a step of displaying an evaluation result of evaluation data, which is obtained by using a selected first evaluation model, in a second display area of the display screen and a step of displaying an evaluation result of the evaluation data, which is obtained by using a selected second evaluation model, in a third display area of the display screen. Further, the evaluation method also includes a step of evaluating second evaluation data based on either the selected first evaluation model or second evaluation model.

Hereinafter, embodiment of the present invention will be described with reference to the drawings. The following embodiment is an example for describing the present invention, and the present invention is not intended to limit the present invention to only the embodiment.

A control object, which is applied to the present invention, includes a plant. For example, the plant is targeted a plant for which process data can be acquired, such as a power generation plant including a boiler, an incineration plant, a chemical plant, a wastewater treatment plant. The process data includes uncalculated data acquired from a sensor or the like.

FIG. 1 is a schematic diagram showing an overall configuration of a plant 1 according to the present embodiment. The plant 1 according to the present embodiment is, for example, a power generation plant including a circulating fluidized bed boiler (circulating fluidized bed type) that generates vapor by burning fuel while circulating a circulation material such as silica sand that flows at a high temperature. As the fuel of the plant 1, for example, a non-fossil fuel (woody biomass, waste tire, waste plastic, sludge, or the like) can be used in addition to the fossil fuel such as coal. The vapor, which is generated in the plant 1, is used to drive a turbine 100.

The plant 1 is configured to burn fuel in a furnace 2, separate the circulation material from exhaust gas by a cyclone 3 functioning as a solid-gas separation device, and return the separated circulation material to the inside of the furnace 2 to circulate the separated circulation material. The separated circulation material is returned to a lower portion of the furnace 2 via a circulation material recovery pipe 4 connected below the cyclone 3. The lower portion of the circulation material recovery pipe 4 and the lower portion of the furnace 2 are connected to each other via a loop seal portion 4a having a narrowed flow path. Accordingly, a predetermined amount of the circulation material is stored in the lower portion of the circulation material recovery pipe 4. The exhaust gas from which the circulation material is removed by the cyclone 3 is supplied to a rear flue 5 via an exhaust gas flow path 3a.

The boiler includes the furnace 2 for burning fuel and a heat exchanger for generating steam or the like by using heat obtained by the combustion. A fuel feed port 2a that supplies fuel is provided in an intermediate portion of the furnace 2, and a gas outlet 2b that exhausts combustion gas is provided in an upper portion of the furnace 2. The fuel, which is supplied to the furnace 2 from a fuel supply device (not illustrated), is supplied to the inside of the furnace 2 via the fuel feed port 2a. Further, a furnace wall pipe 6 for heating a boiler water supply is provided on a furnace wall of the furnace 2. The boiler water supply flowing through the furnace wall pipe 6 is heated by means of combustion in the furnace 2.

In the furnace 2, solid matter, which contains the fuel supplied from the fuel feed port 2a, flows by the combustion/flow air introduced from the lower portion of an air supply line 2c, and the fuel burns at, for example, substantially 800 to 900° C. while flowing. The combustion gas generated in the furnace 2 is introduced into the cyclone 3 with the circulation material. The cyclone 3 separates the circulation material and gas due to a centrifugal separation action, returns the separated circulation material to the furnace 2 via the circulation material recovery pipe 4, and sends out the combustion gas from which the circulation material is removed to the rear flue 5 from the exhaust gas flow path 3a.

In the furnace 2, a part of the circulation material, which is called an in-core bed material, stays at a bottom portion. The bed material may contain a bed material having a coarse particle size, which is unsuitable for circulation flow, or exhaust combustion contaminants, and poor fluidity may occur due to the bed material that is not suitable as a circulation material. Therefore, in order to suppress the poor fluidity, in the furnace 2, the in-core bed material is continuously or intermittently exhausted to the outside from the exhausting port 2d at the bottom portion. The exhausted bed material is supplied to the furnace 2 again or is discarded as it is after removing unsuitable substances such as metal or coarse particle on a circulation line (not illustrated). The circulation material of the furnace 2 circulates in a circulation system including the furnace 2, the cyclone 3, and the circulation material recovery pipe 4.

The rear flue 5 includes a flow path through which the gas exhausted from the cyclone 3 flows to the rear stage. The rear flue 5 includes a superheater 10 that generates superheated steam and a coal economizer 12 that preheats the boiler water supply, as an exhaust heat recovery portion that recovers the heat of the exhaust gas. The exhaust gas flowing through the rear flue 5 is cooled by exchanging heat with the vapor or boiler water supply flowing through the superheater 10 and the coal economizer 12. Further, a steam drum 8, in which the boiler water supply that has passed through the coal economizer 12 is stored, is included, and the steam drum 8 is also connected to the furnace wall pipe 6.

The coal economizer 12 transfers the heat of the exhaust gas to the boiler water supply to preheat the boiler water supply. The coal economizer 12 is connected to a pump 7 by a pipe 21, while being connected to the steam drum 8 by a pipe 22. The boiler water supply, which is supplied from the pump 7 to the coal economizer 12 via the pipe 21 and preheated by the coal economizer 12, is supplied to the steam drum 8 via the pipe 22.

A downcast pipe 8a and the furnace wall pipe 6 are connected to the steam drum 8. The boiler water supply in the steam drum 8 flows down through the downcast pipe 8a, is introduced into the furnace wall pipe 6 on a lower portion side of the furnace 2, and flows toward the steam drum 8. The boiler water supply in the furnace wall pipe 6 is heated by the combustion heat generated in the furnace 2 and evaporates in the steam drum 8 to become vapor.

A saturated steam pipe 8b that exhausts internal vapor is connected to the steam drum 8. The saturated steam pipe 8b connects the steam drum 8 and the superheater 10. The vapor in the steam drum 8 is supplied to the superheater 10 via the saturated steam pipe 8b. The superheater 10 uses the heat of the exhaust gas to superheat the vapor to generate superheated steam. The superheated steam passes through a pipe 10a, is supplied to the turbine 100 outside the plant 1, and is used for power generation.

The pressure and temperature of the vapor exhausted from the turbine 100 is lower than the pressure and temperature of the vapor exhausted from the superheater 10. Although not particularly limited, the pressure of the vapor supplied to the turbine 100 is substantially 10 to 17 MPa, and the temperature is substantially 530 to 570° C. The pressure of the vapor exhausted from the turbine 100 is substantially 3 to 5 MPa, and the temperature is substantially 350 to 400° C.

A steam condenser 102 is provided downstream of the turbine 100. The vapor, which is exhausted from the turbine 100, is supplied to the steam condenser 102, is condensed in the steam condenser 102, and is returned to saturated water, and then is supplied to the pump 7. A generator that converts motion energy obtained by rotation of the turbine 100 into electrical energy is connected to the turbine 100.

The pump 7a supplies make-up water to keep the water level of the steam condenser 102 constant. FIG. 1 shows a make-up water flow rate u1 (an example of the "process data") replenished by the pump 7a.

The process data handled in the present embodiment may be any data related to the plant 1, may be, for example, data (an example of the "process data") obtained by measuring a state of the plant 1 with a sensor, and more specifically, may include measurement values such as the temperature, the pressure, and the flow rate of the plant 1. FIG. 1 shows a boiler water supply flow rate u2 (an example of the "process data") supplied from the pump 7 to the coal economizer 12. Further, FIG. 1 shows a boiler outlet steam flow rate u3 (an example of the "process data") supplied from the superheater 10 to the turbine 100 and shows a saturated steam flow rate u4 (an example of the "process data") supplied from the steam drum 8 to the superheater 10. The make-up water flow rate u1 may be controlled to follow the saturated steam flow rate u4. Further, the boiler water supply flow rate u2 may be controlled to be adjusted while monitoring both the boiler outlet steam flow rate u3 (or the superheated steam flow rate) and the liquid level of the steam drum 8.

When a hole is broken in a pipe system constituting the plant 1, the make-up water flow rate u1 increases, or a flow rate difference between the boiler water supply flow rate u2 and the boiler outlet steam flow rate u3 increases. A distributed control system (DCS, FIG. 2) 20 receives the process data of the plant 1 such as the make-up water flow rate u1, the boiler water supply flow rate u2, the boiler outlet steam flow rate u3, and the saturated steam flow rate u4 from the plant 1, monitors the operation situation of the plant 1, and monitors the plant 1 for any abnormalities.

Although the make-up water flow rate u1, the boiler water supply flow rate u2, the boiler outlet steam flow rate u3, and the saturated steam flow rate u4 are exemplified as the process data, the process data related to the plant 1 may be other data. The process data related to the plant 1 may be other data such as temperature and pressure, or data calculated based on a plurality of process data.

Figure 2:
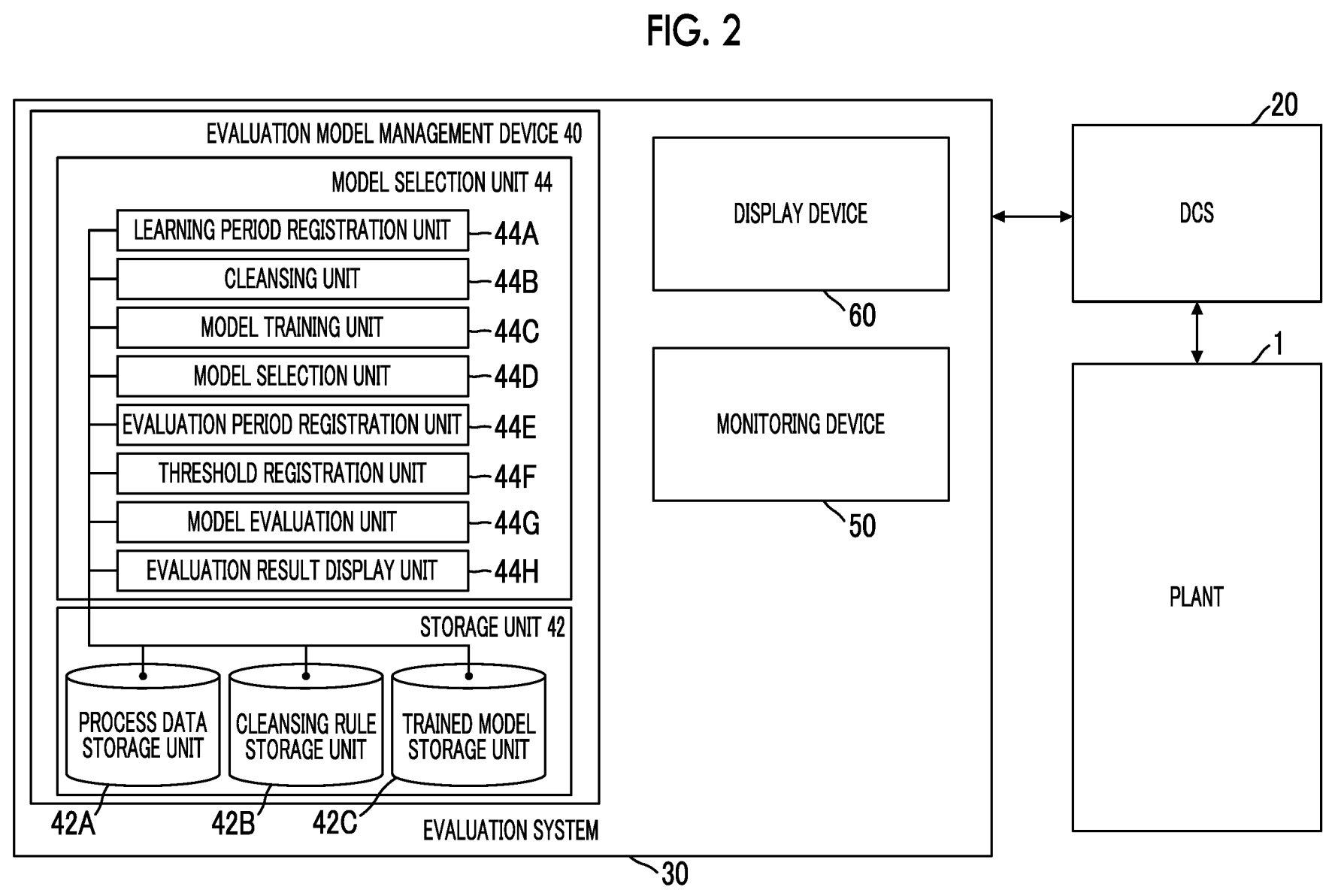

FIG. 2 is a diagram showing a functional block of an evaluation system 30 according to the present embodiment.

The DCS 20 is a distributed control system for controlling the plant 1. The DCS 20 acquires the process data from a sensor or the like installed in the plant 1 and supplies a control signal for controlling the plant 1 to the plant 1 based on the process data.

The evaluation system 30 includes an evaluation model management device 40 for managing and generating an evaluation model for evaluating the operation situation of the plant 1, a monitoring device 50 of the plant 1 for acquiring the process data from the DCS 20 and monitoring the operation situation of the plant 1 based on a selected predetermined evaluation model, and a display device 60 for displaying an image for managing and generating an evaluation model by the evaluation model management device 40 and the operation situation of the plant 1 monitored by the monitoring device 50 of the plant 1. Each component constituting the evaluation system 30 may not be integrally configured. For example, a part or all of the evaluation model management device 40 may be provided at a remote location and may be communicably connected to other components via a communication network such as the Internet.

The evaluation model management device 40 includes a storage unit 42 and a model selection unit 44.

The storage unit 42 includes a process data storage unit 42A, a cleansing rule storage unit 42B, and a trained model storage unit 42C.

The process data storage unit 42A stores the process data acquired from the DCS 20. The process data may include, for example, the process data of the plant 1 or another plant over a long period of time. The process data includes training data (teacher data) for generating the evaluation model. The training data may include, for example, process data when the control object such as the plant 1 is being operated properly at high power, process data when the control object is being operated properly at medium power, and process data when the control object is being operated properly at low power. The training data may include process data when the control object is being operated properly, that is, so as to achieve a predetermined output, and process data when the control object causes an abnormality. Further, the process data may be stored in association with time information in which the process data is acquired. Further, the process data may be stored in association with an output when the process data is acquired and a state of proper operation. The process data does not necessarily have to be acquired via the DCS 20, and may be, for example, directly acquired from the plant 1.

The cleansing rule storage unit 42B stores a rule for executing data cleansing for extracting the training data from the process data. For example, in a case where it is desired to extract the training data when the operation situation of the plant 1 is proper, a rule for executing cleansing that removes data leading to performance deterioration is stored.

The trained model storage unit 42C stores a plurality of trained models generated based on the training data by using the machine learning model. The machine learning model is, for example, a Gaussian process regression model. The training data is, for example, three types of process data of process data obtained when the plant 1 or a similar plant was being operated properly at high power, process data obtained when the plant 1 was being operated properly at medium power, process data obtained when the plant 1 was being operated properly at low power, in the same period during January 2020. The trained model storage unit 42C stores the process data as the training data and stores the trained model generated based on a predetermined machine learning model as one of the evaluation models. Similarly, the trained model storage unit 42C stores a plurality of trained models as the evaluation models. The physical configuration of the storage unit 42 will be described later.

The model selection unit 44 selects an evaluation model used to evaluate the process data acquired from the DCS 20.

A learning period registration unit 44A of the model selection unit 44 registers and stores a period of the process data extracted as the training data. A worker can register the learning period on the display screen of the display device 60. For example, in a case where each period during which the plant was being properly operated at high power, medium power, and low power is identified in advance, the worker can register those periods as the learning periods. A model training unit 44C can generate the trained model using the process data, which is acquired during the period registered in the learning period registration unit 44A as the training data.

A cleansing unit 44B executes a cleansing process of the process data. Specifically, the cleansing process is executed with respect to the process data obtained during a predetermined period extracted by the learning period registration unit 44A based on the cleansing rule stored in the cleansing rule storage unit 42B, and the process data that is unsuitable for generating the evaluation model is removed by applying predetermined machine learning.

The model training unit 44C performs machine learning according to a predetermined machine learning model based on process data which is the training data, generates an evaluation model, and stores the evaluation model in the trained model storage unit 42C. Specifically, the process data, which is acquired during the period registered in the learning period registration unit 44A, is acquired from the process data storage unit 42A, machine learning is performed using the process data, which is obtained by performing the cleansing process by the cleansing unit 44B, as the training data, and then the evaluation model is generated.

The model selection unit 44D receives the selection of the evaluation model by the worker and selects the evaluation model to be used for evaluation by the model evaluation unit 44G. For example, the model selection unit 44D can select two or more evaluation models at the same time. The model selection unit 44D displays a plurality of evaluation models, which are stored in the trained model storage unit 42C, on the display screen of the display device 60 in a selectable manner. The worker can select the plurality of evaluation models to be used for the evaluation from the evaluation models displayed on the display screen.

The evaluation period registration unit 44E registers and stores the period of the process data extracted as the evaluation data. The evaluation period registration unit 44E displays the evaluation period on the display screen of the display device 60 in a settable manner. The worker can register the evaluation period on the display screen of the display device 60. The model evaluation unit 44G evaluates the process data, which is acquired during the period registered in the evaluation period registration unit 44E, as the evaluation data.

A threshold registration unit 44F receives a setting of a threshold (an example of an "evaluation reference") from the worker, and registers and stores the setting as the evaluation reference in the evaluation by the model evaluation unit 44G. The threshold registration unit 44F can register and store the set threshold for each evaluation model by the model evaluation unit 44G. The threshold registration unit 44F displays the threshold on the display screen of the display device 60 in a settable manner, for each evaluation model selected by the model selection unit 44D. The worker can register the threshold for each evaluation model on the display screen of the display device 60.

The model evaluation unit 44G evaluates the evaluation data according to the evaluation model. Specifically, the process data, which is acquired during the evaluation period registered by the evaluation period registration unit 44E, is input as the evaluation data into the plurality of evaluation models selected by the model selection unit 44D, and then an evaluation result is obtained. When the threshold is registered in the threshold registration unit 44F, the model evaluation unit 44G uses the threshold as the evaluation reference for obtaining the evaluation result.

An evaluation result display unit 44H displays the evaluation result of the evaluation data obtained by the selected evaluation model on the display screen of the display device 60 for each evaluation model.

The monitoring device 50 monitors the plant 1 by evaluating the process data acquired from the DCS 20 according to the finally selected evaluation model. For example, the monitoring device 50 can evaluate the process data acquired from the DCS 20 in the present according to the finally selected evaluation model and the set threshold, and display an alarm or the like on the display screen of the display device 60 when the process data exceeding the threshold is acquired.

The display device 60 receives a control signal (including data) for displaying the above-described various information from the evaluation model management device 40 and the monitoring device 50, and displays the control signal on the display screen. FIG. 3 is an example of the display screen D1 of the display device 60.

As shown in the figure, a plurality of evaluation models are displayed in an area AR1 (an example of a "first display area") of the display device 60. The worker can select the plurality of evaluation models from the displayed evaluation models.

In the case of the figure, nine evaluation models, which are from a model No. 0 to a model No. 8, are displayed in the area AR1 in a selectable manner. The worker can select the evaluation model by checking a check boxes provided in the column of "evaluation model selection". The figure shows a state in which the evaluation models with model No. 4 and model No. 7 are selected. The column of "learning date and time" indicates the date and time when the corresponding evaluation model is generated. Further, the column of "actual operation" indicates whether or not the corresponding evaluation model has been used for monitoring the plant 1 by the monitoring device 50 in the present or in the past. The figure shows that the evaluation model with model No. 1 is used for monitoring plant 1 by the monitoring device 50 in the present, and the evaluation model with model No. 3 was used for monitoring the plant 1 by the monitoring device 50 in the past. Therefore, the monitoring device 50 monitors the plant 1 using the process data acquired from the DCS 20 as the evaluation data, by using the evaluation model with model No. 1. In this way, by indicating that it is an evaluation model that was used in the past and that it is an evaluation model that is being used in the present, in order to evaluate the process data, which is acquired from the control object, the worker can use these evaluation models as a reference to compare with different evaluation models. When an upper limit threshold (an example of the "evaluation reference") and a lower limit threshold are set as the evaluation references for the corresponding evaluation model, the columns of the "upper limit threshold" and the "lower limit threshold" displays the upper limit threshold and the lower limit threshold. For example, when a value of the process data exceeds the threshold with respect to the reference value, it may be determined that the operation situation of the plant 1 is not proper.

At the same time, an area AR81 and an area AR82 on the display screen D1 show contents of the training data used for generating the evaluation models with No. 7 and No. 4 selected in the area AR1. By looking at the contents of the training data, the worker can determine whether or not the evaluation model to be selected is generated based on the training data appropriate for evaluating the evaluation data. That is, when the control object is an object whose state changes from moment to moment due to the season, weather, other environments, or changes over time, such as the plant 1, by selecting an evaluation model generated based on the training data similar to the evaluation data to be evaluated, it becomes possible to improve the evaluation accuracy. For example, it may not be appropriate to evaluate the evaluation data obtained in the summer by using the evaluation model generated based on the training data acquired in the winter. Since the display device 60 according to the present embodiment displays the contents of the learning model in which the evaluation model selected in the area AR1 is generated, the worker can increase the probability of acquiring an appropriate evaluation model.

Further, the evaluation system 30 can extract the process data obtained in a plurality of discrete periods as the training data for generating one evaluation model. For example, in the figure, one evaluation model is generated based on the process data obtained in the three periods of a learning period 1 to a learning period 3. That is, when the control object is an object that can take a plurality of states such as low power, medium power, and high power, as in the plant 1, by configuring the training data to include each of the states and generating the evaluation model, it becomes possible to generate a highly versatile evaluation model. The worker can check that the training data is configured to include the process data of the plant 1 indicating a proper operation situation in each state, based on the process data storage unit 42A or other information. The display device 60 may be configured such that the learning period of the evaluation model to be generated can be set without transitioning from the display screen D1 by directly inputting the learning period in the area within the display screen D1 by the worker.

At the same time, the period of the evaluation data, that is, the evaluation period of the plant 1 is displayed in an area AR6 (an example of a "sixth display area") of the display screen D1. By inputting the period, the worker can set the period during which the process data evaluated by the evaluation model is acquired. With such a configuration, the display device 60 makes it possible to acquire an appropriate evaluation model. For example, the worker can determine whether or not the selected evaluation model is appropriate by checking the evaluation results of the plurality of evaluation models while making the evaluation periods different. For example, it is possible to check the evaluation result obtained by using the evaluation model when the period of the evaluation data is set to include the time when the abnormality occurs in the plant 1, and it becomes possible to check whether the evaluation model can detect an abnormality. Thereafter for this time, by setting the period of the evaluation data obtained when the plant 1 was being operated properly and checking the evaluation result obtained by using the evaluation model with respect to the evaluation model that could detect an abnormality, it becomes possible to check whether or not the evaluation model detects an abnormality. Since it is configured such that the area AR6 for setting the period of the evaluation data and the areas AR2 and AR3 for displaying the evaluation results obtained by using the evaluation model are provided and displayed on the display screen D1 at the same time, the worker can quickly acquire an appropriate evaluation model.

At the same time, the thresholds are displayed, as an example of the evaluation reference of the evaluation model selected in the area AR1, in an area AR4 (an example of a "fourth display area") and an area AR5 (an example of a "fifth display area") of the display screen D1. The worker can set the threshold for evaluation by the evaluation model with model No. 7 by inputting the upper limit and the lower limit of the threshold in the area AR4. Similarly, the worker can set the threshold for evaluation by the evaluation model with model No. 4 by inputting the upper limit and the lower limit of the threshold in the area AR5. When a worker inputs a new threshold by using the input unit 30E and presses an "evaluation" button, the evaluation result based on the changed new threshold is displayed in the area AR2. Therefore, it becomes possible to acquire an appropriate evaluation model and an appropriate evaluation reference by setting the threshold such that an abnormality is detected in a case where the period of the evaluation data is set so as to include the time when the abnormality occurred in the plant 1, and by setting the threshold such that an abnormality is not detected in a case where the evaluation data obtained during the period in which the plant 1 was being operated properly is set. Further, it is also possible to determine the superiority or inferiority of the selected evaluation model by comparing each of the evaluation results obtained when the same threshold is set in the area AR4 and the area AR5. The threshold can be configured with an index such as an absolute value, a ratio to the reference value, and a deviation in a settable manner.

At the same time, the evaluation result of the evaluation data obtained by using one of the selected evaluation models is displayed in the area AR2 (an example of a "second display area") of the display screen D1, and the evaluation result of the evaluation data obtained by using the other selected evaluation model is displayed in the area AR3 (an example of a "third display area"). In the area AR2, as the evaluation result, an estimated expectation value, which is calculated based on the training data, is indicated by a solid line, and an upper limit threshold and a lower limit threshold based on the estimated expectation value are indicated by a dashed line. Further, values of the plurality of evaluation data are shown discretely. Values of the training data may be shown discretely. In the figure, for example, in a two-dimensional space where the horizontal axis is defined as a boiler load of the plant 1 (an example of the "process data")

and the vertical axis is defined as a temperature difference between the upper and lower furnaces (an example of the "process data"), by indicating a position of the evaluation data in the same two-dimensional space as an area that can be determined as a proper movable range, that is, an area surrounded by the upper limit threshold to the lower limit threshold including the solid line indicating the estimated expectation value, the evaluation results are displayed. However, the aspect of showing the evaluation result is not limited to the above. For example, the degree of deviation from the optimum operation area may be scored and the evaluation result may be indicated by an index of soundness. Further, for example, the evaluation result may be indicated only by characters. However, as shown in the present embodiment, by selecting two process data as the training data and by displaying a range of proper operation situation and a position of the evaluation data in a recognizable manner in a two-dimensional space with the two process data as axes, the worker can easily identify the evaluation result. In the figure, since there is evaluation data that exceeds a proper movable range, according to the evaluation model with No. 7, it is determined that an abnormality has occurred in the plant 1.

As shown in the figure, the evaluation result obtained by the evaluation model with No. 4 for the same evaluation data is shown in the area AR3. Since the area AR2 and the area AR3 show evaluation results using the same index for the same evaluation data, the worker can easily compare the evaluation models. The training data with respect to different evaluation models do not necessarily have to be different, and a part or all of the training data may be the same. For example, different evaluation models can be generated by making a part of the parameters different. Therefore, it becomes possible to generate different evaluation models based on the same training data.

When the worker changes the period in the area AR6 and presses the "evaluation" button in the area AR4 with an input method such as a mouse, the evaluation result based on the changed evaluation data is displayed in the area AR1.

Further, when the worker changes the threshold in the area AR4 and presses the "evaluation" button in the area AR4 with an input method such as a mouse, the evaluation result based on the changed threshold is displayed in the area AR1.

In this way, since it is possible to change the plurality of evaluation models, change the evaluation data, change the evaluation reference, display the evaluation result with changed contents within one display screen D1, the worker can efficiently acquire an appropriate evaluation model.

Various process data to be adopted as the training data and the evaluation data can be selected. For example, in order to generate the evaluation model for detecting a predetermined abnormality, two or more process data having a correlation with the abnormality can be selected. For example, for the purpose of detecting an abnormality in the plant called "blowout" where the metal material of the tube constituting the boiler is damaged and punctured, and the internal vapor leaks to the outside like a tube leak, the training data and the evaluation data may include process data obtained from a plurality of acoustic emission (AE) sensors provided in a boiler tube or the like to detect the blowout. As other process data, information indicating the temperature of the piping system (including temperature information acquired directly or indirectly from the sensor and information indicating a temperature difference at a predetermined portion), information indicating the amount of heat absorbed, information indicating a valve opening degree, information indicating the temperature of a gas medium, or the like are acquired, and based on these information, evaluation may be executed simultaneously according to each of the plurality of evaluation models. The present invention can be used to select an evaluation model for detecting the presence or absence of a predetermined abnormality based on process data obtained from various sensors, which are provided in each place in the plant 1 and used for detecting a temperature, a pressure, a flow rate, a valve opening degree, a damper opening degree, a liquid level, vibration, sound, and other state quantities of the plant 1.

Further, the evaluation result can be displayed in various forms. For example, the operation situation of the plant may be scored according to the degree of deviation from the optimum area and may be indicated by an index of soundness. The evaluation result may be displayed as text information.

Furthermore, a parameter value (including a hyperparameter) of the parameter, which can be set when performing the machine learning based on the training data, may be displayed on the display screen by the worker in a settable manner. The parameters of the machine learning differ depending on the machine learning model. For example, the display device 60 may be configured such that the number of layers such as decision trees, the number of intermediate layer units in the neural network, a parameter indicating load attenuation, and the like are displayed so that the worker can perform settings. For example, when the worker presses "add new model" shown in an area AR7 (an example of a "seventh display area") of the display screen D1 by using the input method, the display device 60 is configured to transition to a display screen for setting a new parameter value. When the worker inputs a new parameter value, the model training unit 44C performs the machine learning according to the parameter value and generates a new evaluation model. The worker can also set new training data together with the parameter value. For example, the worker can change the period of the training data and set the training data in a shorter period or a longer period, on the display screen. The model training unit 44C performs the machine learning based on the set new training data and generates a new evaluation model.

The display device 60 may be configured to allow the worker to directly set and input at least a part of the parameter value or the training data in the area AR7 of the display screen D1 without transitioning the screen. For example, when over-learning of the evaluation model is observed in the area AR3, the worker can change the parameter value so as to alleviate the over-learning in the area AR7. Further, the worker can set the training data for a longer period of time in order to alleviate the over-learning in the area AR7. The model training unit 44C performs the machine learning according to a newly set parameter value or a learning period, and generates a new evaluation model. Further, the display device 60 can display the evaluation result obtained by the new evaluation model in the area AR3. With such a configuration, the worker can observe the evaluation result while adjusting the range of the parameter value or the training data, and thus it is possible to efficiently acquire an appropriate evaluation model.

Further, the display device 60 may be configured to allow the worker to delete or replicate the evaluation model selected by the worker. For example, it is possible to efficiently acquire an appropriate evaluation model by using a configuration in which the worker is allowed to delete the evaluation model in which highly accurate evaluation cannot be performed. Further, by replicating an existing evaluation model and changing and evaluating the evaluation reference of the replicated evaluation model, it is possible to efficiently acquire an appropriate evaluation model.

Figure 4:
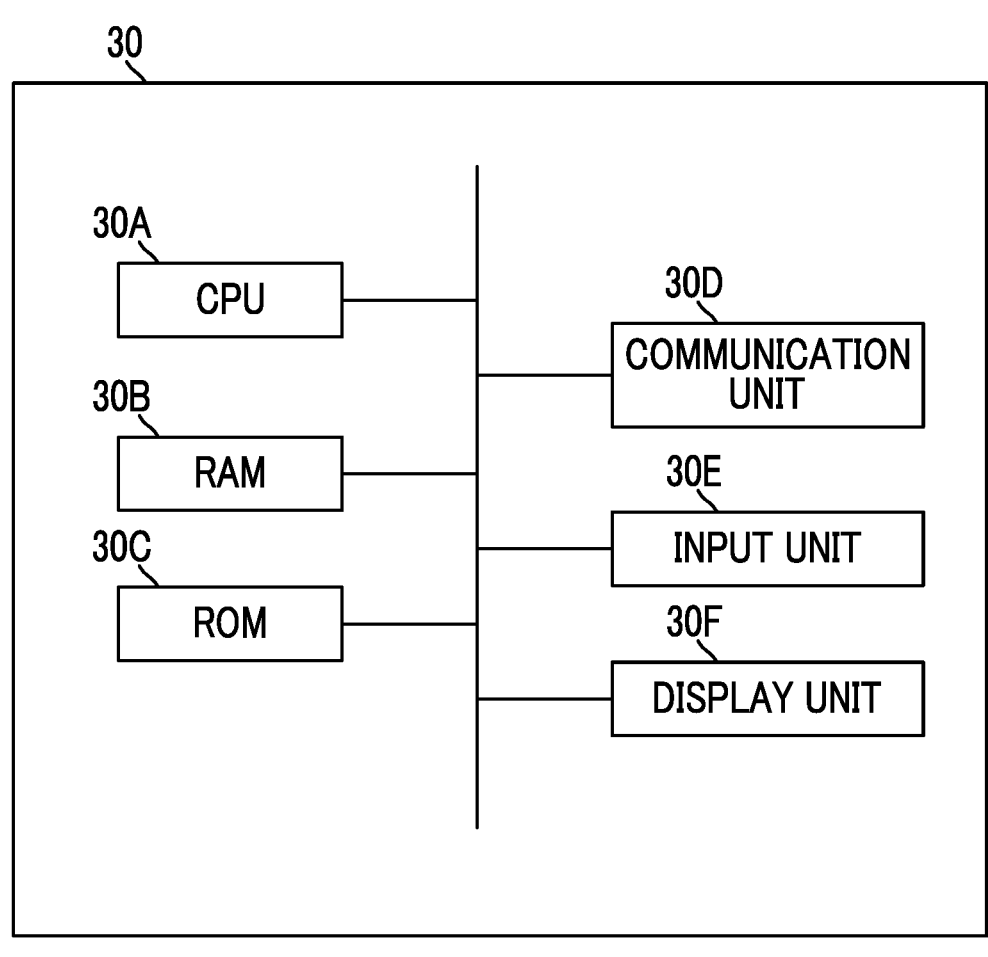
FIG. 4 is a block diagram showing a physical configuration of the evaluation system.

FIG. 4 is a block diagram showing a physical configuration for implementing the evaluation system 30. The evaluation system 30 includes a central processing unit (CPU) 30A corresponding to a calculation unit, a random access memory (RAM) 30B corresponding to a storage unit, a read only memory (ROM) 30C corresponding to a storage unit, a communication unit 30D, an input unit 30E, and a display unit 30F. Each of these configurations is connected to each other via a bus or a communication network such that data can be transmitted and received. In the present example, although a case where the evaluation system 30 is composed of one computer will be described, the evaluation system 30 may be implemented by combining a plurality of computers. For example, in addition to the display unit 30F, a display constituting different display units for displaying other information may be provided. Further, the configuration shown in FIG. 4 is an example, and the evaluation system 30 may have configurations other than these or may not include a part of these configurations. Further, a part of the configuration may be provided in a remote location. For example, all or a part of the storage unit 30C may be provided in a remote location. In this case, the CPU 30A may be configured to acquire information from a storage unit 30C provided in a remote location via the communication network.

The CPU 30A is a calculation unit including a computer processor that executes a computer program stored in the RAM 30B or the ROM 30C and performs each calculation process described in the present embodiment. That is, the CPU 30A implements each function executed by each unit of the model selection unit 44 according to the computer program, and makes the worker to acquire an appropriate evaluation model. Further, the CPU 30A may implement a monitoring function in which the monitoring device 50 monitors the plant 1 based on the process data under the selected evaluation model. Further, the CPU 30A may implement each function executed by the DCS 20. The CPU 30A receives various data from the input unit 30E and the communication unit 30D, displays a calculation result of the data on the display unit 30F, or stores the data in the RAM 30B or the ROM 30C.

The RAM 30B is a storage element that records information such as data in a rewritable manner, and may be composed of, for example, a semiconductor storage element such as a DRAM, a SRAM, an MRAM, a NOR memory, or a NAND memory. The RAM 30B can implement each function of the storage unit 42 by storing the computer program executed by the CPU 30A, the process data of the plant 1, the cleansing rule, the trained model, and the like. The primary storage element such as DRAM or SRAM may be configured to store the evaluation result or the like obtained by the evaluation model. The ROM 30C is a storage element capable of reading information, and may be composed of, for example, a write-protected semiconductor storage element such as a NOR memory, a magnetic storage medium such as an HDD, or an optical storage medium such as a DVD. The ROM 30C may store a computer program executed by the CPU 30A or other data that is not rewritten.

The communication unit 30D is an interface for connecting the evaluation system 30 to the DCS 20 and other devices. The communication unit 30D may be connected to a communication network such as the Internet.

The input unit 30E may receive data input from the worker and may be composed of, for example, a keyboard, a touch panel, or a microphone.

The display unit 30F may visually display various calculation processing results shown in the present embodiment by the CPU 30A and a monitoring state of the plant 1 obtained by the monitoring device 50 and may be composed of, for example, a display such as a liquid crystal display (LCD). The display unit 30F implements each function executed by the display device 60.

The computer program for executing various processes shown in the present embodiment may be stored and provided in a computer-readable storage medium such as ROM 30C and may be provided via a communication network connected by the communication unit 30D. In the evaluation system 30, various operations included in the present embodiment are implemented by the CPU 30A executing a monitoring program. These physical configurations are examples and may not necessarily be independent configurations. For example, the CPU 30A and the RAM 30B may be composed of a packaged large-scale integration (LSI).

Figure 5:
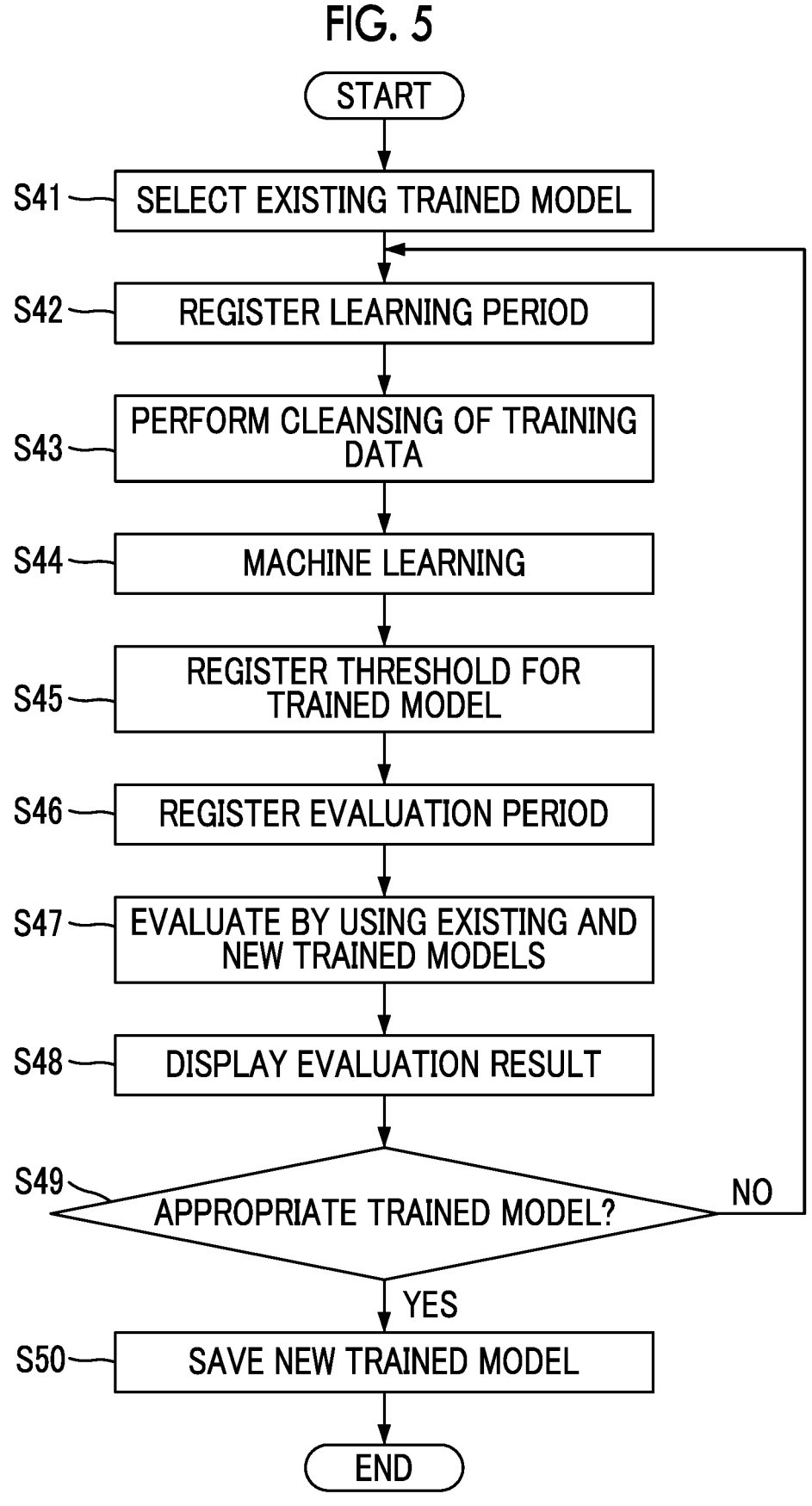
FIG. 5 is a flowchart of an evaluation method according to the present embodiment.

Hereinafter, the evaluation method of the evaluation model according to the present embodiment will be described. FIG. 5 is a flowchart showing, for example, an example of an evaluation method of comparing an existing evaluation model with a newly generated evaluation model.

First, the evaluation system 30 (the CPU 30A operated according to the computer program) reads the existing trained model stored in the trained model storage unit 42C and displays the existing trained model in the area AR1 of the display device 60. The worker uses the input unit 30E to select one or a plurality of trained models (sometimes referred to as an "evaluation model") from the plurality of trained models displayed in the area AR1 (step S41). Since the information related to the training data used to generate the selected trained model is shown in the area AR81 or the area AR82, the worker can select an appropriate trained model. The model selection unit 44D receives the input from the worker and selects the trained model to be evaluated.

Next, the worker inputs the period information by using the input unit 30E and registers the period of the training data (which may be referred to as a "learning period") for generating a new trained model. The learning period registration unit 44A receives the input from the worker, registers the learning period, and acquires the process data corresponding to the learning period from the process data storage unit 42A (step S42). The input of the period information may be performed by allowing the worker to input the period information in the area AR81 or the area AR82. The learning period may be different for each trained model, may be the same, or may be set so as to partially overlap.

The cleansing unit 44B performs cleansing of the process data corresponding to the learning period according to the cleansing rule stored in the cleansing rule storage unit 42B and removes data unsuitable for the machine learning, process data not used for the machine learning (for example, process data that is not affected by the abnormality or has a small affection in generation of an evaluation model for detecting a predetermined abnormality), and the like (step S43).

The model training unit 44C performs the machine learning based on the training data, in which data cleansing is performed by the cleansing unit 44B, and generates a new trained model (step S44). At this time, the evaluation system 30 may be configured such that the worker can set the parameter value (for example, the number of layers of the neural network) of the machine learning model. The trained model, which is generated by the model training unit 44C, is stored in the trained model storage unit 42C.

Next, the worker inputs the threshold in the area AR4 and the area AR5 by using the input unit 30E. The threshold registration unit 44F receives the input from the worker and registers the threshold for each trained model (step S45).

Next, the worker inputs the evaluation period of the plant 1 in the area AR6 by using the input unit 30E. The evaluation period registration unit 44E receives the input from the worker, registers the evaluation period, and acquires the process data acquired from the process data storage unit 42A during the evaluation period as the evaluation data (step S46). For example, the worker can evaluate whether or not the trained model to be evaluated can correctly detect an abnormality by selecting the evaluation period so as to include a time point at which the abnormality occurred in the plant 1.

The model evaluation unit 44G evaluates the evaluation data based on the existing trained model. The evaluation result display unit 44H provides the display device 60 with information included in the area AR2 including the evaluation result. At the same time, the model evaluation unit 44G evaluates the evaluation data based on the new trained model generated in step S44 and the threshold set in step S45. The evaluation result display unit 44H provides the display device 60 with information included in the area AR3 including the evaluation result (step S47). The display device 60 receives the evaluation result from the evaluation system 30 and displays the evaluation result in the area AR2 and the area AR3 (step S48).

Next, the worker looks at the evaluation results displayed in the areas AR2 and AR3 and determines whether or not the newly generated trained model is appropriate for monitoring the plant 1 (step S49). The worker may determine whether or not the trained model is appropriate by re-executing the evaluation by changing the evaluation period or the threshold, if necessary. For example, when the evaluation result obtained by using the newly generated trained model can evaluate the operation situation of plant 1 more accurately than the evaluation result obtained by using the existing trained model, it is possible to determine that the newly generated trained model is appropriate.

When it is determined to be appropriate, the worker presses a "set for actual model" button displayed in the area AR4 or the area AR5 corresponding to the newly generated trained model by using the input unit 30E. The evaluation system 30 saves the newly generated trained model in the trained model storage unit 42C (step S50). From the next time onward, the newly generated trained model can be displayed in the area AR1 as one of the existing trained models. Further, the monitoring device 50 may start monitoring the plant 1 based on the process data acquired from the DCS 20 according to one or the plurality of trained models including the newly generated trained model.

In step S49, when it is determined that the generated trained model is inappropriate, the process returns to step S42 again. In addition to re-registering the learning period, a new trained model may be generated by changing a parameter of the machine learning model.

As described above, according to the display device, the evaluation method, and the evaluation system described in the present embodiment, it is possible to efficiently acquire an appropriate evaluation model.

In particular, it is possible to easily create a new evaluation model on the same screen without transitioning screens, and for the same evaluation data, it is possible to display the evaluation result obtained by using the new evaluation model and the evaluation result obtained by using the existing evaluation model on the same screen. Further, by changing the parameter, it is possible to adjust the existing evaluation model or a new evaluation model, easily generate a different evaluation model, and compare the evaluation result with an evaluation result of another evaluation model. As described above, according to the display device, the evaluation method, and the evaluation system according to the present embodiment, since it is possible to easily create an evaluation model, adjust the evaluation model, and compare the evaluation models with each other, it is possible to efficiently acquire an appropriate evaluation model.

The present invention can be used for applications other than selecting an evaluation model for detecting an abnormality in a plant, which is called a blowout. For example, it is possible to apply the present invention for detecting a decrease in power generation efficiency, clogged pipes, abnormal temperature of each element in a plant such as furnace, change in viscosity of fluid such as gas, or the like, or for selecting an evaluation model for determining detectability. Further, it is possible to apply the present invention not only to detect an abnormality but also to select and generate an evaluation model for improving a process, which is executed in a facility such as each plant, based on process data.

Furthermore, the present invention can be applied to a process executed in a facility other than a thermal power generation plant. For example, the present invention can be applied to select and generate an evaluation model for evaluating abnormalities or the like (for example, signs of gas leakage due to corrosion of pipes or the like) related to each of facilities such as a chemical plant, an oil refinery, an oil factory, a steel factory, or processes executed in a part of the facilities, based on process data. For example, the present invention can be applied to select and generate an evaluation model for evaluating fluid leak potential after disposing a plurality types of sensors such as a plurality of temperature sensors and AE sensors in a piping system in which branch pipes are welded to a main pipe, and based on process data such as temperature information acquired at a predetermined sampling frequency by using these sensors.

Further, the present invention can be modified in various ways as long as the present invention does not deviate from the concept thereof. For example, within the normal creative abilities of those skilled in the art, some components or functions in one embodiment can be replaced with other components or functions. For example, in the present embodiment, the model training unit 44C generates a new trained model by using machine learning, but the present invention is not limited thereto. For example, the model training unit 44C may be configured to generate a trained model based on a regression equation. Further, it is not always necessary to execute each step shown in the flowchart.

It should be understood that the invention is not limited to the above-described embodiment, but may be modified into various forms on the basis of the spirit of the invention. Additionally, the modifications are included in the scope of the invention.

What is claimed is:

1. A display device which is communicably connected to an evaluation model management device, the display device comprising:
  a processor;
  a display screen; and
  a memory storing instructions thereon, the instructions when executed by the processor causing the processor to:

display, in a first area of the display screen, a plurality of evaluation models for selection,
  responsive to receiving a first learning period registered for acquiring first training data, generate a first evaluation model of the plurality of evaluation models by using the first training data, which is acquired during the first learning period,
  responsive to receiving a second learning period, which is different from the first learning period, registered for acquiring second training data, generate a second evaluation model of the plurality of evaluation models by using the second training data which is acquired during the second learning period,
  responsive to receiving selection of the first evaluation model of the plurality of evaluation models, display a first evaluation result generated by applying process data to the first evaluation model, in a second area of the display screen simultaneously with the first area of the display screen, and
  responsive to receiving selection of the second evaluation model of the plurality of evaluation models with the first evaluation model selected, display a second evaluation result generated by applying the process data to the second evaluation model, in a third area of the display screen simultaneously with the first area and the second area.

2. The display device according to claim 1, wherein the instructions further cause the processor to:
  display a first evaluation reference in a fifth area of the display screen for comparing the first evaluation model with evaluation models other than the first evaluation model simultaneously with the first area, the second area, and the fifth area,
  responsive to receiving a change in the first evaluation reference displayed in the fifth area, update the first evaluation result in the second area according to the change in the first evaluation reference,
  display a second evaluation reference for comparing the second evaluation model with evaluation models other than the second evaluation model in a sixth area of the display screen simultaneously with the first area, the second area, the third area, and the fifth area, and
  responsive to receiving a change in the second evaluation reference, update the second evaluation result in the third area of the display screen according to the change in the second evaluation reference.

3. The display device according to claim 2, wherein the instructions further cause the processor to:
  display, in a seventh area of the display screen, the first learning period for generating the first evaluation result, and
  responsive to receiving a change in the first learning period, update the first evaluation result displayed in the second area of the display screen.

4. The display device according to claim 3,
  wherein the first evaluation model is generated, based on a training data range, by using a machine learning model having a predetermined parameter, and
  wherein the instructions further cause the processor to:
    display, in an eighth area, a value of the predetermined parameter and the training data range,
    responsive to receiving a change in the value of the predetermined parameter or the training data range, update the machine learning model, and
    update the first evaluation result as displayed in the second area according to the updated machine learning model.

5. The display device according to claim 4, wherein the instructions further cause the processor to:

display the updated machine learning model having the changed value of the predetermined parameter together with the plurality of evaluation models in the first area of the display screen for selection.

6. The display device according to claim 1, wherein the instructions further cause the processor to:

replicate or delete an evaluation model displayed in the first area responsive to receiving an input to replicate or delete the evaluation model.

7. An evaluation method comprising:

displaying, in a first area of a display screen, a plurality of evaluation models for selection;

responsive to receiving a first learning period registered for acquiring first training data, generating a first evaluation model of the plurality of evaluation models using the first training data, which is acquired during the first learning period;

responsive to receiving a second learning period, which is different from the first learning period, registered for acquiring second training data, generating a second evaluation model of the plurality of evaluation models by using the second training data which is acquired during the second learning period;

responsive to receiving selection of the first evaluation model of the plurality of evaluation models, displaying a first evaluation result generated by applying process data to the first evaluation model, in a second area of the display screen simultaneously with the first area of the display screen; and responsive to receiving selection of the second evaluation model of the plurality of evaluation models with the first evaluation model selected, displaying a second evaluation result generated by applying the process data to the second evaluation model, in a third area of the display screen simultaneously with the first area and the second area.

8. The display device according to claim 1, wherein the instructions further cause the processor to:

display, in the first area of the display screen, an indication of whether each of the plurality of evaluation models is currently used or was previously used for evaluating process data received from a control object.

9. The display device according to claim 1, wherein the instructions further cause the processor to:

display contents of training data used for generating the first evaluation model and the second evaluation model selected, in a fourth area of the display screen simultaneously with the first area, the second area, and the third area.

\* \* \* \* \*